3,088,973
RING CHLORINATED 2,5-DIPHENYLADIPIC ACID
Harry Braus, Springdale, and Otto A. Homberg, Woodlawn, Ohio, assignors to National Distillers and Chemical Corporation, New York, N.Y., a corporation of Virginia
No Drawing. Filed July 22, 1959, Ser. No. 828,720
4 Claims. (Cl. 260—515)

This invention relates broadly to new and novel organic compounds and, more particularly, to halogenated derivatives of diphenyladipic acid and to methods for the preparation of such halogenated acids.

These novel chemical compounds may be prepared by subjecting diphenyladipic acid to reaction with a halogen, preferably in the presence of a suitable solvent and a selected halogenation catalyst. The products may be halogenated in the ring, in the chain, or in both the ring and the chain and are represented by the following formulas:

(I)

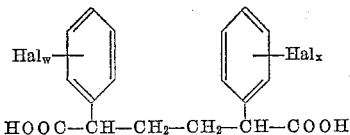

wherein Hal represents a halogen and $w$ and $x$ is each an integer within the range of 0 to 4, $w$ plus $x$ being equal to 4.

(II)

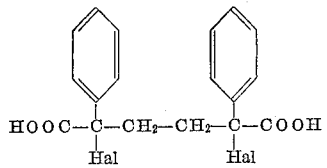

wherein Hal represents a halogen.

(III)

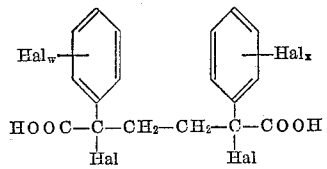

wherein Hal represents a halogen and $w$ and $x$ is each an integer within the range of 0 to 4, $w$ plus $x$ being equal to 4.

In the preparation of halogenated diphenyladipic acid as embodied herein, a suitable method for the preparation of the diphenyladipic acid in relatively high yields with resultant corresponding high yields of its derivatives comprises the selective dimerization of styrene in the presence of an alkali metal to yield dialkali metal derivatives that, upon carbonation followed by acidification, yield substantially pure diphenyladipic acid. For example, diphenyladipic acid in high yields may be prepared by the selective dimerization of styrene in the presence of finely dispersed sodium or potassium in a suitable liquid medium, e.g., ethylene glycol diethyl ether, and a relatively small amount of polycyclic aromatic compound, e.g., o-terphenyl at a temperature below about 0° C., whereby the dialkali metal derivative of dimerized styrene results, followed by carbonating, e.g., with solid carbon dioxide, the dialkali metal derivative and acidifying, e.g., with hydrochloric acid, the carbonated product to yield diphenyladipic acid. In this and similar manners, $\alpha,\alpha'$-diphenyladipic acid may be prepared by reaction of styrene with finely dispersed sodium and used for preparing the derivatives as described hereinafter.

While the present invention will be described primarily with reference to the chlorination, it is not intended to be limited thereto. It is to be understood that the present invention will apply equally to other halogenation, such as bromination, of diphenyladipic acid.

To prepare the unique compounds of the present invention, in one specific embodiment diphenyladipic acid is reacted with a chlorinating agent either alone or in the presence of a chlorination catalyst and in the presence of a suitable solvent at reflux temperature of the selected solvent-reactant system. The chlorinating agent, preferably elemental chlorine, is added until no further absorption takes place; the reaction mixture is then filtered to remove any unreacted material and the solvent is removed, e.g., by distillation. The product may be purified by anhydrous treatment or by treatment with caustic, such as a dilute solution of sodium hydroxide; when anhydrous conditions are employed, the residue is collected, cooled at about 25° C. until it solidifies, and further dried under vacuum. When sodium hydroxide is used, the residue is taken up in hot dilute sodium hydroxide solution (about 10%) and precipitated by acidification with concentrated hydrochloric acid; the resulting residue is then collected, washed free of chloride ions, and air-dried.

The chlorination of diphenyladipic acid may take place in any suitable solvent, preferably a chlorinated solvent such as, for example, trichloroacetic acid, chloroform, or carbon tetrachloride, in an amount corresponding to about 0.1 to 3 parts of diphenyladipic acid to 10 parts of solvent, and preferably about 0.5 to 2 parts of diphenyladipic acid to 10 parts of solvent.

The amount of chlorine in the final product depends on the amount of chlorine supplied to the acid. In general, chlorine is added until complete absorption has taken place, the chlorine content of the final product being about 15 to about 42 percent and representing 2 to 6 chlorine atoms per molecule. The positioning of the chlorine atoms depends largely upon the chlorination conditions, the product usually having both chain and ring chlorine atoms. In order to assure maximum chlorination in the ring, for example, the diphenyladipic acid is preferably chlorinated in the presence of a conventional ring-chlorinating catalyst, such as, for example, iodine in the absence of light. When maximum chlorination in the chain is desired, the catalyst may be benzoyl peroxide in the presence of ultraviolet light. The catalyst may be present in any amount ranging from about 1 to about 20 mole percent, and preferably about 1 to 10 mole percent. In contrast to the nuclear chlorine atoms, the chain chlorine atoms are relatively labile and may be removed, if desired, by any suitable procedure; for example, the chain chlorine atoms are sufficiently labile to permit their being hydrolyzed by simple solution in an alkaline medium such as 10 percent NaOH, which does not affect nuclear chlorine atoms. The —OH groups of the resulting dihydroxy derivative of chlorinated diphenyladipic acid may be removed simply by heating the compound with any convenient dehydrating agent.

The chlorination reaction proceeds smoothly at the reflux temperature of the system employed. Somewhat lower temperatures may be employed, if desired, without affecting the course of the reaction.

This process yields products having chlorine atoms in the ring, in the chain, and in both the ring and the chain, as is indicated in the following formula:

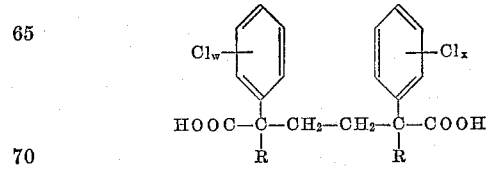

wherein $w$ and $x$ is each an integer within the range of 0 to 4 and R is either hydrogen or a chlorine atom, the sum of the chlorine atoms being 2 to 6. The compounds containing both ring and chain chlorine atoms may, if desired, be readily converted to compounds having chlorine atoms only in the ring. The removal of the chain chlorine atoms may be accomplished, for example, by refluxing the chlorinated acid in dilute caustic solution.

The halogenated diphenyladipic acids of the present invention may be used for many purposes, including as a chemical intermediate and in the preparation of plasticizers, resins, synthetic lubricants, insecticides, herbicides, and the like. In particular, chlorinated diphenyladipic acid has been found to be a desirable compound for reaction with a suitable alcohol to form an ester which, when used as a plasticizer, imparts novel and unobvious properties to a resin. As an example, chlorinated diphenyladipic acid was heated with isooctyl alcohol in the presence of a catalytic amount of titanium tetrachloride to form the diisooctyl ester which proved to be a satisfactory plasticizer for polyvinyl chloride resins. Other useful derivatives of the chlorinated acid include its acyl chloride, its amide, and its substituted amides, such as N-n-butylamide and N-isobutylamide.

The more detailed practice of the present invention is illustrated by the following examples wherein parts are given by weight unless otherwise specified. These examples are illustrative only and are not intended to limit the invention in any way except as indicated by the appended claims.

*Example I*

A suspension of 150 parts of diphenyladipic acid and 12.8 parts of iodine in 1500 parts of chloroform was treated with 300-340 parts of chlorine over a period of five hours at 61° C. in the absence of light. The resulting solution was flushed with nitrogen to remove any dissolved hydrogen chloride and excess chlorine. The solution was then filtered to remove any unreacted diphenyladipic acid, and the solvent was removed by distillation under vacuum. The residue then contained 41.4 percent chlorine in the ring and in the chain. The material was then dissolved in dilute sodium hydroxide solution to hydrolyze the chain chlorine atoms, filtered, and the chlorinated acid precipitated by acidification with hydrochloric acid. It was then washed with water to remove the chloride ions and air-dried to yield the dihydroxy derivative of chlorinated diphenyladipic acid which melted at 80-90° C., had a neutral equivalent of 220-280, and contained 32.87 percent chlorine in the ring. Oxidation of the chlorinated acid with alkaline potassium permanganate solution yielded 3,4-dichlorobenzoic acid, M.P. 203-4° C.

*Example II*

A suspension of 10 parts of diphenyladipic acid and 0.9 part of iodine in trichloroacetic acid was treated with 100 parts of chlorine over a period of 3½ hours at 95-105° C. in the absence of light. The resulting solution was then poured onto crushed ice, warmed on a steam bath until the ice had melted, and filtered. The residue was taken up in hot 10 percent sodium hydroxide and reprecipitated by acidification with concentrated hydrochloric acid. The resulting material was collected, washed with water, and air-dried. The chlorinated acid thus obtained contained 32.1 percent chlorine in the ring.

*Example III*

A suspension of 150 parts of diphenyladipic acid and 1.5 parts of benzoyl peroxide in 1500 parts of carbon tetrachloride was treated with 60 parts of chlorine over a period of 14 hours at about 80° C. in the presence of ultraviolet light. The resulting solution was flushed with nitrogen to remove any dissolved hydrogen chloride and excess chlorine. The product, which was insoluble in the carbon tetrachloride, was collected by filtration, ground, and dried in a vacuum desiccator. The resulting chlorinated acid contained 18.6 percent chlorine in the chain. Refluxing the product with 10 percent NaOH resulted in substantially complete removal of the chlorine, only 0.48 percent remaining after four hours.

*Example IV*

100 parts of ring-chlorinated diphenyladipic acid, prepared by the procedure of Example I, was heated at 235° C. for one hour with 100 parts of isooctyl alcohol in the presence of 0.1 mole percent of titanium tetrachloride. The excess alcohol was removed under reduced pressure. The diisooctyl ester thus prepared was a dark viscous oil having an acid number of 6.78 and containing 21.8 percent chlorine. A composition consisting of 50 parts of the diisooctyl ester and 100 parts of polyvinyl chloride resin was milled at 300-305° F. to yield a plastic sheet having a tensile strength of 4600 p.s.i., a 100% modulus of 4250 p.s.i., 375 percent elongation, and excellent heat stability; the material was completely flameproof, no ignition taking place under any of the standard test conditions to which it was subjected.

Chlorinated diphenyladipic acid also has been used to prepare several other chemical compounds, such as the amides, as may be seen in the following examples.

*Example V*

A solution of 10 parts of ring-chlorinated diphenyladipic acid, prepared by the procedure of Example I, and 15 parts of thionyl chloride in 25 parts of benzene was heated under reflux for one hour. The excess thionyl chloride was removed by distillation. The benzene solution thus prepared was added slowly to 100 parts of cool concentrated ammonia solution. When the addition was complete, the mixture was heated on a steam bath to remove the benzene, the mixture was cooled to room temperature, and the product was collected. The crude amide was then purified by dissolving it in 100 parts of ethanol, filtering, treating the filtrate with 300 parts of benzene, and evaporating the resulting solution to 100 parts. The solvent was removed, yielding the amide of diphenyladipic acid which softened at 85° C., had an acidity of 15 percent, and contained 5.3 percent N (5.0 percent calculated).

*Example VI*

The benzene solution of the acyl chloride of diphenyladipic acid, as prepared in Example V, was added slowly to a cool solution of 12 parts of n-butylamine in 25 parts of benzene. The mixture was heated on a steam bath for 5 minutes and then treated with 250 parts of distilled water, heated to remove the benzene, and cooled to room temperature. The crude product was purified according to the procedure used in Example V, yielding the N n-butylamide of diphenyladipic acid which softened at 40° C. and contained 4.0 percent N (4.3 percent calculated).

While several illustrative examples of the practice of this invention have been given, it will be understood that the invention may be practiced in other ways and that various modifications and changes may be made in the example given without departing from the spirit of the invention or from the scope of the following claims.

What is claimed is:

1. A mixture of ring-chlorinated 2,5-diphenyladipic acids having a total of up to four chlorine atoms per molecule prepared by passing a stream of chlorine through a suspension of 2,5-diphenyladipic acid in a solvent selected from the group consisting of trichloroacetic acid, chloroform, and carbon tetrachloride in the presence of about 1 to 20 mole percent of iodine in the absence of light at reflux temperature of the system and recovering the ring-chlorinated 2,5-diphenyladipic acids.

2. The mixture of ring-chlorinated 2,5-diphenyladipic acids of claim 1 wherein the solvent is chloroform and the reaction temperature is 61° C.

3. The mixture of ring-chlorinated 2,5-diphenyladipic acids of claim 1 wherein the number of chlorine atoms is four.

4. A mixture of ring-chlorinated 2,5-diphenyladipic acids having four chlorine atoms per molecule prepared by passing a stream of chlorine through a suspension of 2,5-diphenyladipic acid in chloroform in the presence of about 1 to 20 mole percent of iodine in the absence of light at 61° C., dissolving the product in dilute caustic solution, and treating with hydrochloric acid to precipitate the mixture of ring-chlorinated 2,5-diphenyladipic acids.

References Cited in the file of this patent

UNITED STATES PATENTS 2,724,643    Morris et al. _____ Nov. 22, 1955

OTHER REFERENCES

Wilson et al.: Chem. Abstracts, vol. 37 (1943), page 6195.

Fierz-David et al.: Chem. Abstracts, vol. 44, page 1077, 1950.

Wagner et al.: Synthetic Org. Chem., 1953, pages 102–103.

Groggins: Unit processes in Organic Synthesis, 5th ed., pp. 234–237 (1958).